Figures 1, 2:
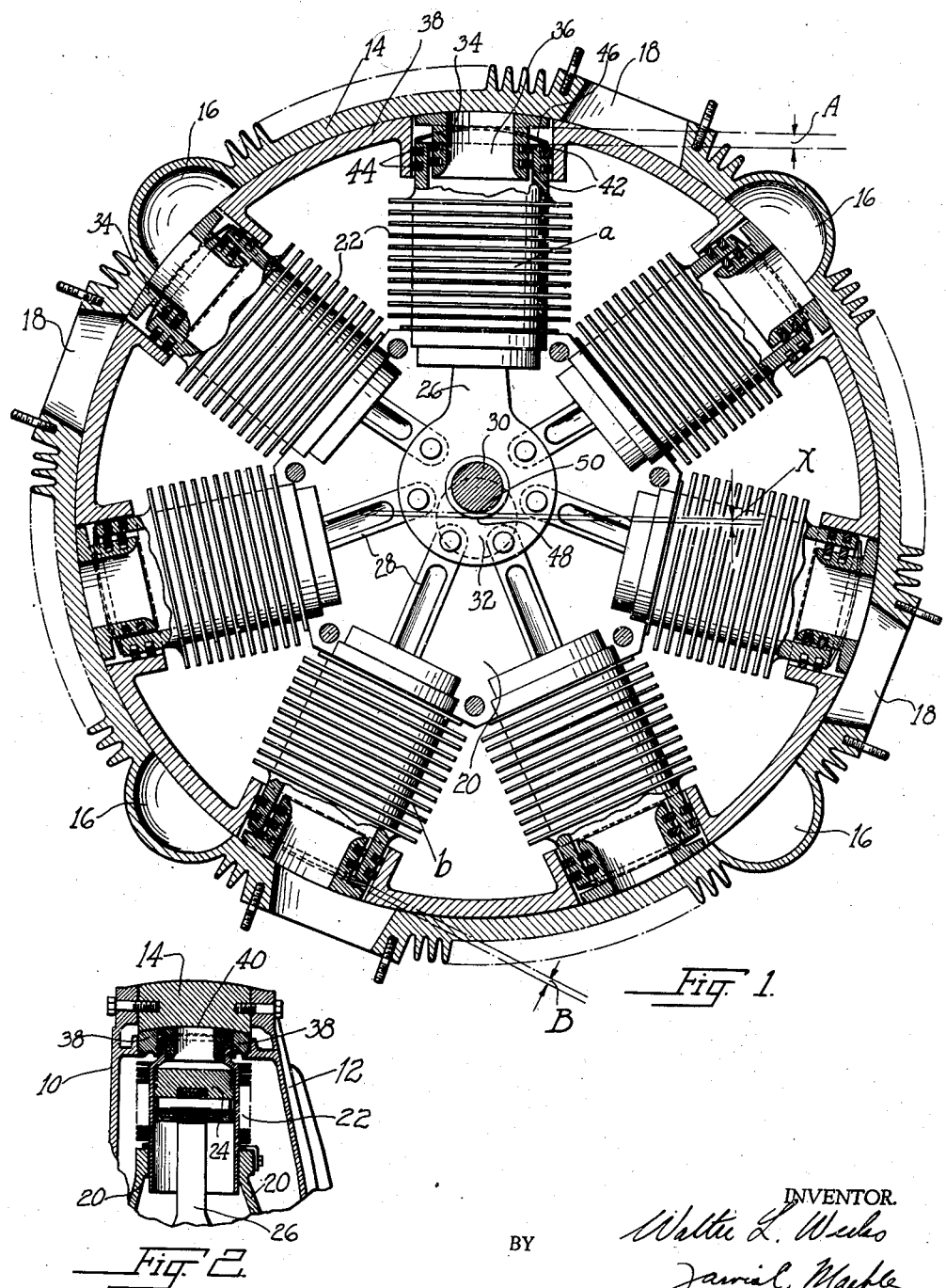

Aug. 20, 1940.  W. L. WEEKS  2,212,283
ENGINE
Filed July 6, 1938

INVENTOR.
Walter L. Weeks
BY
his ATTORNEY.

Patented Aug. 20, 1940

2,212,283

UNITED STATES PATENT OFFICE 2,212,283

ENGINE

Walter L. Weeks, Cranford, N. J., assignor to Mawen Motor Corporation, New York, N. Y., a corporation of Delaware Application July 6, 1938, Serial No. 217,667

7 Claims. (Cl. 123—44)

The present invention relates to engines and has particular reference to radial engines of the type in which there is relative rotation between a bank of cylinders and an encircling annular valve member having ports for controlling the admission or exhaust of gases, or both, to and from the cylinders of the bank. In such engines the cylinders may rotate with respect to a stationary valve member or the valve member may also rotate but at different speed from that of the cylinders. In such engines, if the valve member is stationary, the crank shaft as well as the cylinders revolve so that in all cases at least two of the major component parts of the engine revolve. Consequently, this type of engine may generically be referred to as a bi-rotary engine.

In bi-rotary engines, one of the major problems involved in obtaining satisfactory engine operation is that of providing a seal which will remain satisfactorily gas tight when the engine is in operation, to prevent escape of gases from between the relatively sliding parts which form the seal between the cylinder ends and the ported valve member. In order to maintain an effective seal between these parts it has heretofore been proposed to employ individual sealing elements associated with each cylinder of the bank, such elements being carried by the cylinders at their outer ends so as to have movement with respect to the cylinders in the direction of the axes of the cylinders and with the outer ends of the sealing element bearing against the inner surface or track of the valve member.

The present invention has for its object the improvement of this type of construction in order to insure continued freedom of movement of the sealing elements over long periods of engine operation so that the elements will unfailingly continue to make sealing contact with the valve track.

The manner in which the above general object and other and more detailed objects are attained and the advantages to be derived from use of the invention will best be understood from a consideration of the ensuing portion of this specification taken in conjunction with the accompanying drawing illustrating preferred embodiment of engine construction to which the invention is applied.

In the drawing:

Fig. 1 is a central section taken on a plane normal to the axis of rotation of the crank shaft of an engine embodying the invention, and Fig. 2 is a fragmentary section on a smaller scale of the engine shown in Fig. 1, taken on a plane passing through the axis of the crank shaft.

Referring now to the drawing, the engine comprises a casing structure including front and rear casing members 10 and 12, respectively, between which members is secured an annular valve member 14 provided with a series of peripherally spaced intake ports 16 and exhaust ports 18.

The cylinder bank comprises a crank case structure 20 carrying a series of radially arranged cylinders 22, of which there are seven in the present embodiment, mounted for relative rotation with respect to the casing structure. The pistons 24 are connected, in the embodiment shown, by means of a master rod 26 and rods 28 to the crank pin 30 of the engine crank shaft 32.

The cylinders are open at their outer ends and each cylinder carries an annular cuff-like sealing element 34 in telescopically sliding relation with the cylinder. In the embodiment illustrated the sealing elements 34 include cylindrical portions inserted in the cylinder necks, which is the preferred arrangement, but in so far as the present invention is concerned these sealing elements may telescopically encircle the cylinder necks. The sealing elements provide cylinder ports 36 for registration with the valve ports, and the latter ports are closed, when not in registration with a cylinder port, by means of a sealing ring 38 the outer surface of which is in sliding contact with the valve track and which has suitable openings for the reception of the several cylinder necks and sealing elements. The ring 38 may be in one piece as shown or may be constituted of a series of shoes forming sealing ring segments. Preferably, but not necessarily, the inner face or valve track 40 of the valve member is spherically curved and the outer faces of the sealing elements and sealing ring likewise are spherically curved to mate with the valve track. In order to prevent leakage of cylinder gases between the telescoped portions of the cylinders and the sealing elements, packing rings 42 are employed, which are preferably in the form of expanding piston rings of the usual kind seated in grooves in the inner one of these two telescoped parts, which in the present instance is the cylindrical portion of the sealing element 34. Advantageously, additional packing rings 44 are carried in grooves in the cylinder neck and seal against encircling flanges on the sealing ring to provide a further seal against leakage of the cylinder gases.

As will be noted from Fig. 1, some clearance in radial direction with respect to the cylinder axis is provided between the telescoped portions of the sealing parts and their respectively cooperating cylinders, this clearance in the drawing being considerably exaggerated for the sake of clearness. Also it is to be noted that substantial clearance axially of the cylinder is provided between the end of each cylinder neck and the overlying flange portion of the sealing element. Advantageously, in this space a light spring 46 is employed to insure sealing contact between the sealing element and the valve track at low or idling engine speeds when centrifugal force is insufficient to keep the sealing element in contact.

The general structural features above described are known and it is not believed to be necessary to describe them in further detail for an understanding of the present invention.

In the operation of the engine, the cylinders rotate relative to the valve ring to perform the desired cycle of engine operation, in a manner which is well known and which may vary widely insofar as the present invention is concerned, to provide whatever cycle of engine operation is desired.

In such engines, as heretofore constructed, the cylinder bank has been mounted to rotate relative to the valve ring about an axis coincidental with the center about which the circular valve track is formed, so that there is no relative movement in radial direction between the cylinders and the valve track except such movement as may be induced by differential expansion resulting from different temperatures of the working parts, or slight distortion of the parts relative to each other due to mechanical stress. Consequently, in the usual construction as heretofore employed, the movement of the sealing elements axially of the cylinders has been negligible and in the operation of internal combustion engines this lack of movement tends to cause the sealing elements to become stuck in the necks of the cylinders due to accumulation of gummy residues from the engine lubricant which eventually may become carbonized. Also this lack of movement tends to cause the rings to stick in their grooves even if the sealing element is not stuck or frozen in the cylinder neck by deposits of carbon or other gummy residuals. It will be evident that the effectiveness of the seal between the cylinder ports and the valve ports will be greatly reduced if not destroyed by sticking of the sealing elements in the cylinders, and leakage between the cylinder neck and the sealing element will be greatly enhanced if the packing rings become stuck in their grooves.

In accordance with the present invention, the difficulties of the above nature heretofore encountered are eliminated by so constructing the engine that relative movement in radial direction as well as in rotary direction is produced between the cylinder bank and the valve ring, this radial movement resulting in movement axially of the sealing elements relative to the cylinders. The relative radial movement of the cylinders with respect to the valve track also may be utilized to produce lateral movement of the sealing elements with respect to the parts of the cylinders which they telescope, that is, movement of these elements with respect to the cylinders in planes normal to the axes of the respective cylinders.

Such movements will obviously tend to keep the sealing elements free in the respective cylinder necks since the movement of these elements axially of the cylinders, which for convenience may be termed longitudinal movement, tends to make the rings work longitudinally in their grooves and the lateral movement tends to make the rings work radially in their grooves.

The desired radial movement of the cylinders with respect to the valve track as they rotate relative thereto is secured by mounting the cylinder bank for rotation about an axis slightly off center with respect to the center of the valve track. In actual practice the extent of this offsetting required to effect the purposes of the invention is relatively very slight, for example of the order of from ten thousandths (.010) to twenty thousandths (.020) of an inch. In the drawing this offsetting of the centers has been shown greatly exaggerated in relation to the size of the engine for the sake of clarity and, as shown in Fig. 1, the center of rotation of the cylinder bank is indicated at 48 while the center of the circular valve track is at 50, the amount of offset being represented by the distance X.

With the relatively rotatable cylinder bank and valve member mounted on offset centers, the manner in which the longitudinal movement of the sealing elements relative to the cylinders is effected will be largely obvious from Fig. 1. Assuming for the sake of explanation that the valve ring is stationary and that the cylinder bank rotates it will be evident that the cylinder at the top of the valve member, in position $a$, will be radially furthest away from the valve track so that the sealing element will be at the outer end of its path of longitudinal travel with respect to the cylinder in order to remain in contact with the valve track. As the cylinder turns with respect to the valve track the end of the cylinder comes progressively nearer the track so that by the time the cylinder has reached the position $b$ near the bottom of the ring the sealing element has been forced inwardly of the cylinder nearly to the inner end of its path of longitudinal travel, which inner end is reached when the cylinder reaches the position diametrically opposed to position $a$, relative to the valve member. As the cylinder continues to revolve from such diametrically opposed position to position $a$ the sealing element again moves outwardly, that during a complete revolution of the cylinder relative to the valve member the sealing element makes one complete reciprocation in a sort of pumping action similar to the action of a piston in a cylinder, except that the stroke is extremely short. With the centers offset as indicated at X the extent of this stroke is substantially indicated by the difference between the amount of clearance between the flange on the sealing element and the end of the cylinder represented by A when the cylinder is in position $a$ and the clearance B when the cylinder is in the position $b$. The sealing ring 38, having the same external diameter as the internal diameter of the valve track rotates about the center of the valve track rather than about the center of the cylinder bank. Consequently the sealing ring has movement relative to the cylinders similar in nature to the movement of the sealing elements. This movement tends to keep the rings 44 free by causing them to work in their grooves in the directions of the axes of the several cylinders.

Each cylinder, as it moves from a position relative to the valve member in which it is in line with the plane passing through the offset centers (for example position $a$) to a position relative to the valve member at right angles to this plane, progressively moves more and more out of alignment with a plane passing through the center of the valve member. When the cylinder reaches a position relative to the valve member at right angles to position a, the axis of the cylinder is parallel to but offset from the plane passing through the center of the valve member by the amount X by which the centers are offset. Consequently, when in this position the axis of the sealing element must be slightly out of line or cocked with respect to the axis of the cylinder if uninterrupted sealing contact between the spherically curved surfaces is to be maintained. This movement of the sealing element with respect to the axis of its cylinder is permitted by the clearance between the telescoped parts and this movement of the sealing element laterally with respect to the axis of the cylinder results in a certain amount of working of the packing rings radially of their grooves. The nature of this lateral working of the sealing elements in the cylinders has been indicated in Fig. 1, wherein the clearance between these parts is shown greatly exaggerated.

Advantageously the sealing ring, whether it be integral or segmental, is made so as to form a continuous ring the outer diameter of which is substantially the same as the diameter of the valve track and the openings in this sealing ring are further advantageously made so as to provide a close fit between the ring and the portions of the sealing elements which project therethrough. With the sealing ring constructed in this manner it will be evident that it will rotate about the center of the valve track rather than about the center of the cylinder bank and consequently the flange portions of the sealing ring which make contact with the cylinders must move longitudinally and laterally with respect to the cylinders in the same manner as the sealing elements. This movement will induce movement of the packing rings 44 in their grooves similar to the movement of rings 42 in their grooves, thus tending to keep all of the rings in free working condition in their respective grooves.

Due to the fact that the cylinders pass through positions in which their axes are out of line with a plane passing through the center of the valve member it will be apparent that the extent to which the centers of the relatively rotating parts can be offset is limited, and preferably this amount of offsetting of the centers should be maintained as small as possible while still providing sufficient relative radial movement between the cylinders and the valve member to insure appreciable working of the packing rings in their grooves.

It will be evident from the foregoing that, without departing from the principles of the invention, many different specific forms of sealing means may be utilized and different specific engaging arrangements between the sealing parts may be employed. The invention is accordingly to be understood as embracing all forms of structure falling within the scope of the appended claims when they are construed as broadly as is consistent with the state of the prior art.

What is claimed is:

1. In a bi-rotary engine, a cylinder bank including a plurality of cylinders open at their outer ends, an annular valve member encircling said cylinder bank and having an inner surface forming a valve track and sealing elements carried by said cylinders arranged to move in sliding contact with said valve track and to be relatively movable longitudinally of the respective cylinders, said cylinder bank and said valve member being mounted for relative rotary movement with respect to each other and having centers offset with respect to each other whereby to cause longitudinal movement of the sealing elements relative to the cylinders as the sealing elements move in sliding contact with the valve track.

2. In a bi-rotary engine, a cylinder bank and an encircling annular valve member mounted for relative rotary movement therebetween and having offset centers, and sealing elements carried by the cylinders, said sealing elements being mounted to have relative movement with respect to their associated cylinders and moving in sliding contact with said valve member.

3. In a bi-rotary engine, a bank of cylinders and an annular encircling valve member mounted for relative rotary movement therebetween and having offset centers, sealing elements carried by said cylinders, said sealing elements being telescopically mounted at the outer ends of the several cylinders for longitudinal movement with respect to the cylinder axes and packing rings for sealing the telescoped parts, said sealing elements moving in sliding contact with the valve member and moving longitudinally with respect to the cylinders upon relative rotary movement between the cylinder bank and the valve member.

4. In a bi-rotary engine, a cylinder bank, an annular valve encircling member, said valve member and said bank being mounted for relative rotary movement therebetween, sealing elements carried by the several cylinders of the bank, said sealing elements being telescopically mounted at the outer ends of the cylinders for longitudinal movement with respect thereto and there being clearance permitting lateral movement of the sealing elements with respect to the cylinders, and sealing rings between the telescoped parts, the centers of the cylinder bank and the valve member being offset and said sealing elements moving longitudinally and laterally with respect to the cylinders due to the sliding contact of the sealing elements with the valve member as the cylinder bank and valve member rotate relative to each other about their offset centers.

5. In a bi-rotary engine, a cylinder bank and an annular valve member mounted for relative rotary movement therebetween, said valve member having a spherically curved valve track and the outer ends of said cylinders being open and providing cylindrical surfaces for sliding engagement with sealing elements, hollow sealing elements in telescopic engagement with the cylindrical surfaces at the outer ends of the cylinders, said sealing elements having spherically curved surfaces at their outer ends engaging said valve track in sliding contact, and packing rings for sealing the telescoped surfaces of the cylinders and sealing elements, the centers of the cylinder bank and the valve ring being offset to cause longitudinal movement of the sealing elements with respect to the ends of the cylinders as the cylinders move relative to the valve member.

6. A bi-rotary engine having a cylinder bank and an annular valve member mounted for relative rotary movement therebetween, sealing means between the cylinders of the bank and the valve member, said sealing means comprising sealing elements carried by the cylinders at their outer ends and mounted to have movement relative to the cylinders and a sealing ring carried by the cylinder bank and movable relative to the outer ends of the cylinders, said sealing elements and sealing ring having sliding contact with the valve member, and the centers of said cylinder bank and said valve member being offset to cause the relative rotary movement therebetween to produce relative movement of the sealing means with respect to the cylinders.

7. In a bi-rotary engine, a cylinder bank and an annular valve member mounted for relative rotary movement therebetween, sealing means between the cylinders and the valve member, said sealing means comprising sealing elements having cylindrical portions inserted in the open outer end portions of the cylinders and sealing surfaces in sliding contact with the valve member and a sealing ring in sliding contact with the valve member, said sealing ring having portions encircling the open outer end portions of the cylinders, and packing rings between the outer end portions of the cylinders on the one hand and the sealing elements and the sealing ring on the other hand, the centers of the cylinder bank and the valve member being offset from each other to cause relative movement between the ends of the cylinders and the portions of the sealing means in engagement therewith upon relative rotary movement between the cylinder bank and the valve member.

WALTER L. WEEKS.